(12) United States Patent
Sethia et al.

(10) Patent No.: US 11,853,722 B2
(45) Date of Patent: Dec. 26, 2023

(54) AUTOMATICALLY VALIDATING DESIGN PARAMETERS FOR ENTERPRISE APPLICATIONS

(71) Applicant: EMC IP Holding Company LLC, Hopkinton, MA (US)

(72) Inventors: Rishav Sethia, Bengaluru (IN); Vivek Bhargava, Bangalore (IN); Shubham Gupta, Jaipur (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 499 days.

(21) Appl. No.: 17/235,226

(22) Filed: Apr. 20, 2021

(65) Prior Publication Data

US 2022/0334805 A1    Oct. 20, 2022

(51) Int. Cl.
  *G06F 9/44*  (2018.01)
  *G06F 8/20*  (2018.01)
  *G06T 7/00*  (2017.01)
  *G06N 20/00* (2019.01)
  *G06N 5/04*  (2023.01)
  *G06F 18/22* (2023.01)

(52) U.S. Cl.
  CPC ........... *G06F 8/20* (2013.01); *G06F 18/22* (2023.01); *G06N 5/04* (2013.01); *G06N 20/00* (2019.01); *G06T 7/0002* (2013.01); *G06T 2207/20081* (2013.01)

(58) Field of Classification Search
  None
  See application file for complete search history.

(56) References Cited

U.S. PATENT DOCUMENTS

| | | | | |
|---|---|---|---|---|
| 5,485,621 A  * | 1/1996 | Schwanke | ................. | G06F 8/20 717/121 |
| 7,793,271 B2 * | 9/2010 | Raffo | ........................ | G06F 8/20 717/124 |
| 10,043,255 B1 * | 8/2018 | Pathapati | .................. | G06F 8/38 |
| 10,599,399 B2 * | 3/2020 | Chen | ........................ | G06F 8/20 |

(Continued)

OTHER PUBLICATIONS

Wang et al., Image Quality Assessment: From Error Visibility to Structural Similarity, IEEE Transactions on Image Processing, vol. 13, No. 4, Apr. 2004.

*Primary Examiner* — Qamrun Nahar
(74) *Attorney, Agent, or Firm* — Ryan, Mason & Lewis, LLP (57) ABSTRACT

Methods, apparatus, and processor-readable storage media for automatically validating design parameters for enterprise applications are provided herein. An example computer-implemented method includes obtaining image data and code data of a given application associated with an enterprise; processing at least a portion of the image data against at least a portion of design parameters of the enterprise by processing the at least a portion of the image data and a set of design-compliant image data using similarity algorithms; processing at least a portion of the code data against at least a portion of the design parameters by performing an automated scan of the at least a portion of the code data against at least one code-related portion of the design parameters; and performing automated actions based on the processing of the image data and/or the processing of the code data.

20 Claims, 5 Drawing Sheets

(56) References Cited

U.S. PATENT DOCUMENTS

| | | | |
|---|---|---|---|
| 2011/0082819 A1* | 4/2011 | Kuester | G06F 8/20 |
| | | | 717/101 |
| 2020/0242534 A1* | 7/2020 | Klink | G06Q 10/06395 |
| 2021/0089278 A1 | 3/2021 | Dunn et al. | |
| 2022/0147341 A1* | 5/2022 | Thakore | G06F 8/20 |

* cited by examiner

```
1   # import the necessary packages
2   from skimage.measure import compare_ssim
3   import argparse
4   import imutils
5   import cv2
6   # construct the argument parse and parse the arguments
7   ap = argparse.ArgumentParser()
8   ap.add_argument("-f", "--first", required=True,
9       help="first input image")
10  ap.add_argument("-s", "--second", required=True,
11      help="second")
12  args = vars(ap.parse_args())
13
14  # load the two input images
15  imageA = cv2.imread(args["first"])
16  imageB = cv2.imread(args["second"])
17  # convert the images to grayscale
18  grayA = cv2.cvtColor(imageA, cv2.COLOR_BGR2GRAY)
19  grayB = cv2.cvtColor(imageB, cv2.COLOR_BGR2GRAY)
20
21  # compute the Structural Similarity Index (SSIM) between the two
22  # images, ensuring that the difference image is returned
23  (score, diff) = compare_ssim(grayA, grayB, full=True)
24  diff = (diff * 255).astype("uint8")
25  print("SSIM: {}".format(score))
26
27  # threshold the difference image, followed by finding contours to
28  # obtain the regions of the two input images that differ
29  thresh = cv2.threshold(diff, 0, 255,
30      cv2.THRESH_BINARY_INV | cv2.THRESH_OTSU)[1]
31  cnts = cv2.findContours(thresh.copy(), cv2.RETR_EXTERNAL,
32      cv2.CHAIN_APPROX_SIMPLE)
33  cnts = imutils.grab_contours(cnts)
34
35  # loop over the contours
36  for c in cnts:
37      # compute the bounding box of the contour and then draw the
38      # bounding box on both input images to represent where the two
39      # images differ
40      (x, y, w, h) = cv2.boundingRect(c)
41      cv2.rectangle(imageA, (x, y), (x + w, y + h), (0, 0, 255), 2)
42      cv2.rectangle(imageB, (x, y), (x + w, y + h), (0, 0, 255), 2)
43  # show the output images
44  cv2.imshow("Original", imageA)
45  cv2.imshow("Modified", imageB)
46  cv2.imshow("Diff", diff)
47  cv2.imshow("Thresh", thresh)
48  cv2.waitKey(0)
```

AUTOMATICALLY VALIDATING DESIGN PARAMETERS FOR ENTERPRISE APPLICATIONS

FIELD

The field relates generally to information processing systems, and more particularly to techniques for application management using such systems.

BACKGROUND

Many applications are released on a periodic basis, but before going to production, application development teams commonly have to complete an analysis pertaining to branding and visual design guidelines. Conventional analysis techniques comprise navigating time-consuming and labor-intensive processes across multiple development team entities before an application can be approved for go-to-market (GTM). One step among such processes includes manually processing the application user interface (UI) against preset enterprise design guidelines.

However, such conventional techniques commonly result in missing and/or overlooking details that are only available via code (e.g., color codes, design components, etc.) during manual processing, which causes visual inconsistencies and/or discrepancies in the code that can lead to delays in the GTM process and ultimately lead to delays in the application release cycle.

SUMMARY

Illustrative embodiments of the disclosure provide techniques for automatically validating design parameters for enterprise applications. An exemplary computer-implemented method includes obtaining image data and code data of a given application associated with at least one enterprise, and processing at least a portion of the image data against at least a portion of one or more design parameters of the at least one enterprise by processing the at least a portion of the image data and at least one set of design-compliant image data using one or more similarity algorithms. The method also includes processing at least a portion of the code data against at least a portion of the one or more design parameters of the at least one enterprise by performing an automated scan of the at least a portion of the code data against at least one code-related portion of the one or more design parameters of the at least one enterprise. Further, the method includes performing one or more automated actions based at least in part on one or more of the processing of the at least a portion of the image data and the processing of the at least a portion of the code data.

Illustrative embodiments can provide significant advantages relative to conventional analysis techniques. For example, problems associated with visual inconsistencies and application release cycle delays caused by error-prone manual processing are overcome in one or more embodiments through automatically validating an application against enterprise design parameters by processing image data and code data of the application using similarity algorithms and automated code scanning processes.

These and other illustrative embodiments described herein include, without limitation, methods, apparatus, systems, and computer program products comprising processor-readable storage media.

BRIEF DESCRIPTION OF THE DRAWINGS

FIG. 3 shows an example code snippet for comparing two images and computing at least one similarity value related thereto in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
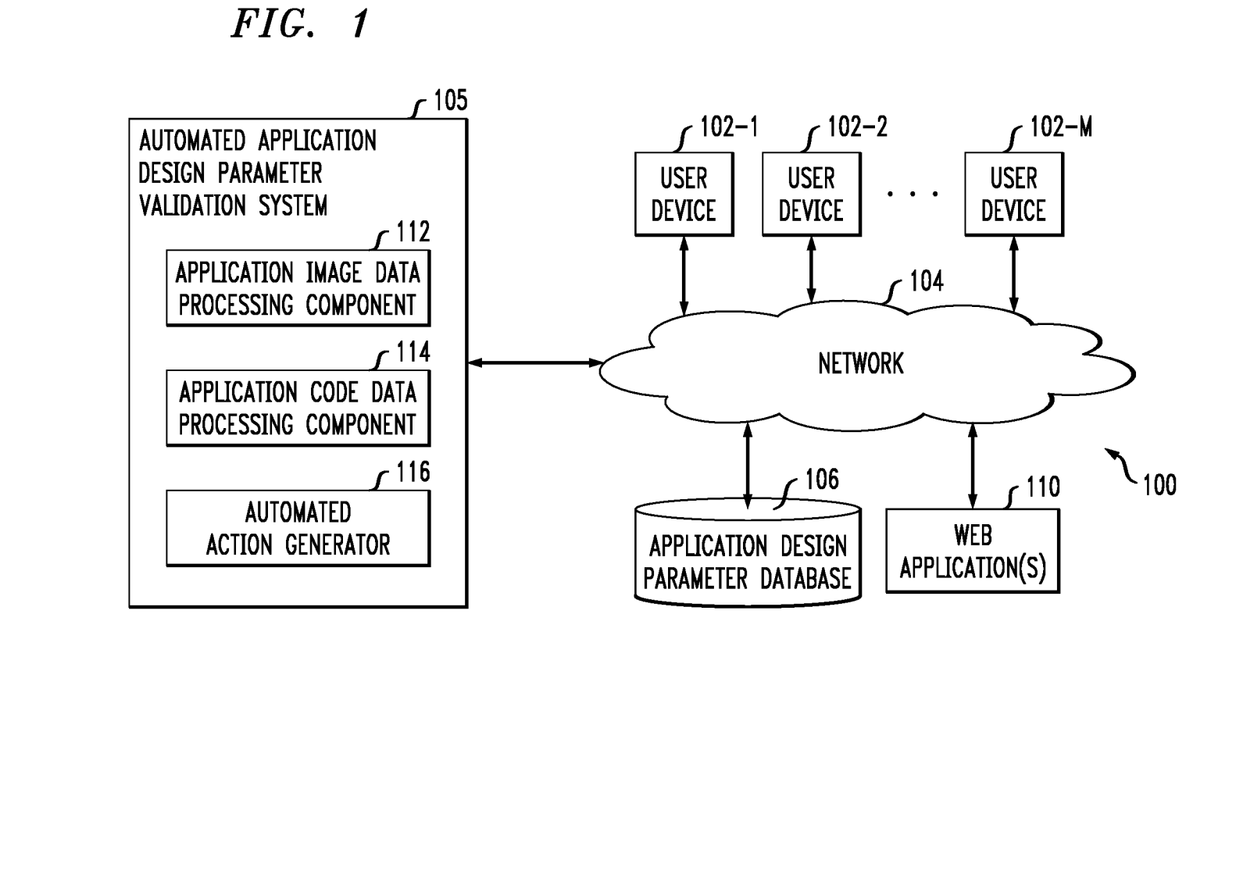
FIG. 1 shows an information processing system configured for automatically validating design parameters for enterprise applications in an illustrative embodiment.

FIG. 1 shows a computer network (also referred to herein as an information processing system) 100 configured in accordance with an illustrative embodiment. The computer network 100 comprises a plurality of user devices 102-1, 102-2, ... 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 are one or more web applications 110 (e.g., applications attempting to be deployed onto at least one enterprise network and/or system) and automated application design parameter validation system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated application design parameter validation system 105 can have an associated application design parameter database 106 configured to store data pertaining to enterprise-approved and/or enterprise-required design and/or branding guidelines, which comprise, for example, application-related data pertaining to iconography, user interface components, user interface layout, required links, application version information, approved color codes, font families, license validation for third party components, modified components selected from a design kit, icon libraries, etc.

The application design parameter database 106 in the present embodiment is implemented using one or more storage systems associated with automated application design parameter validation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated application design parameter validation system 105 can be one or more input-output devices, which illustratively comprise keyboards, displays or other types of input-output devices in any combination. Such input-output devices can be used, for example, to support one or more user interfaces to automated application design parameter validation system 105, as well as to support communication between automated application design parameter validation system 105 and other related systems and devices not explicitly shown.

Additionally, automated application design parameter validation system 105 in the FIG. 1 embodiment is assumed to be implemented using at least one processing device. Each such processing device generally comprises at least one processor and an associated memory, and implements one or more functional modules for controlling certain features of automated application design parameter validation system 105.

More particularly, automated application design parameter validation system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs. One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated application design parameter validation system 105 to communicate over the network 104 with the user devices 102, and illustratively comprises one or more conventional transceivers.

The automated application design parameter validation system 105 further comprises an application image data processing component 112, an application code data processing component 114, and an automated action generator 116.

It is to be appreciated that this particular arrangement of elements 112, 114 and 116 illustrated in automated application design parameter validation system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automatically validating design parameters for enterprise applications involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of automated application design parameter validation system 105, application design parameter database 106, and web application(s) 110 can be on and/or part of the same processing platform.

An exemplary process utilizing elements 112, 114 and 116 of an example automated application design parameter validation system 105 in computer network 100 will be described in more detail with reference to the flow diagram of FIG. 4.

Accordingly, at least one embodiment includes automatically validating design parameters for enterprise applications (e.g., prospective enterprise applications). Such an embodiment includes validating any kind of application that reaches an enterprise governing body for GTM against preset design and/or branding guidelines, and providing approval from a visual design and/or user experience standpoint based at least in part on the validating efforts. As detailed herein, one or more embodiments include scanning the code of a working application to ensure that the components utilized adhere to the design standards and/or guidelines of a given enterprise (guidelines pertaining, e.g., to approved color codes, font families, icon libraries, etc.). Such components can refer to the building blocks of an interface that enables the user to navigate through and use the given application. Apart from the visual component(s), other components can contain the respective code of the design.

As highlighted above, one or more embodiments include code scanning, which can include determining and/or identifying one or more border features (e.g., width, opacity, color scheme, etc.), one or more label and/or field-related checks (e.g., placeholder text), one or more relative paddings, margins and spacings of elements, selector design information, and/or one or more data validation scenario-specific design elements.

As noted, one or more embodiments include performing automated validation at the visual level and the code level. At the visual level, such an embodiment includes validating components such as, for example, iconography, UI components (e.g., dropdowns, form fields, card views, list views, etc.), UI layout (e.g., tabs, segmented controls, navigation menus, sidebar navigation, etc.), mandatory legal links (e.g., terms of use, privacy policy, etc.), and application version information. At the code level, such an embodiment includes validating components and/or requirements that cannot be validated visually such as, for example, color codes, font family, license validation for new third-party components, components selected from a design kit that have been modified during implementation, etc.

The automated validation techniques detailed herein assist in ensuring that applications meet one or more enterprise standards. Additionally, based on the outcome of such validation techniques, at least one embodiment includes performing one or more automated actions such as, for example, automatically making one or more deviations to the application and/or UI in question and/or automatically suggesting one or more modifications to a developer associated with the application and/or UI in question. In such an embodiment, if the developer chooses not to implement such a suggestion, the developer can raise and/or submit a request to have the existing and/or built component approved by the automated validation system, helping to create a more robust design kit fitting common use cases.

As also described herein, one or more embodiments can be offered and/or implemented as an as-a-service model with one or more varieties of implementations. Such implementation varieties can include, for example, integration within one or more continuous integration/continuous deployment (CI/CD) pipelines of projects, enabled, for example, to run temporally-defined (e.g., weekly) scans and report variations with the help of at least one configuration file which will have related mappings of the design system(s). Such implementation varieties can also include, for example, a common platform for designers and development teams to perform manual scans and review resulting (automatically generated) reports as required. Such users (e.g., designers, development teams, etc.) can also request possible alternate designs and/or modifications via such a platform (eliminating the need for series of back-and-forth emails with enterprise personnel).

Figure 2:
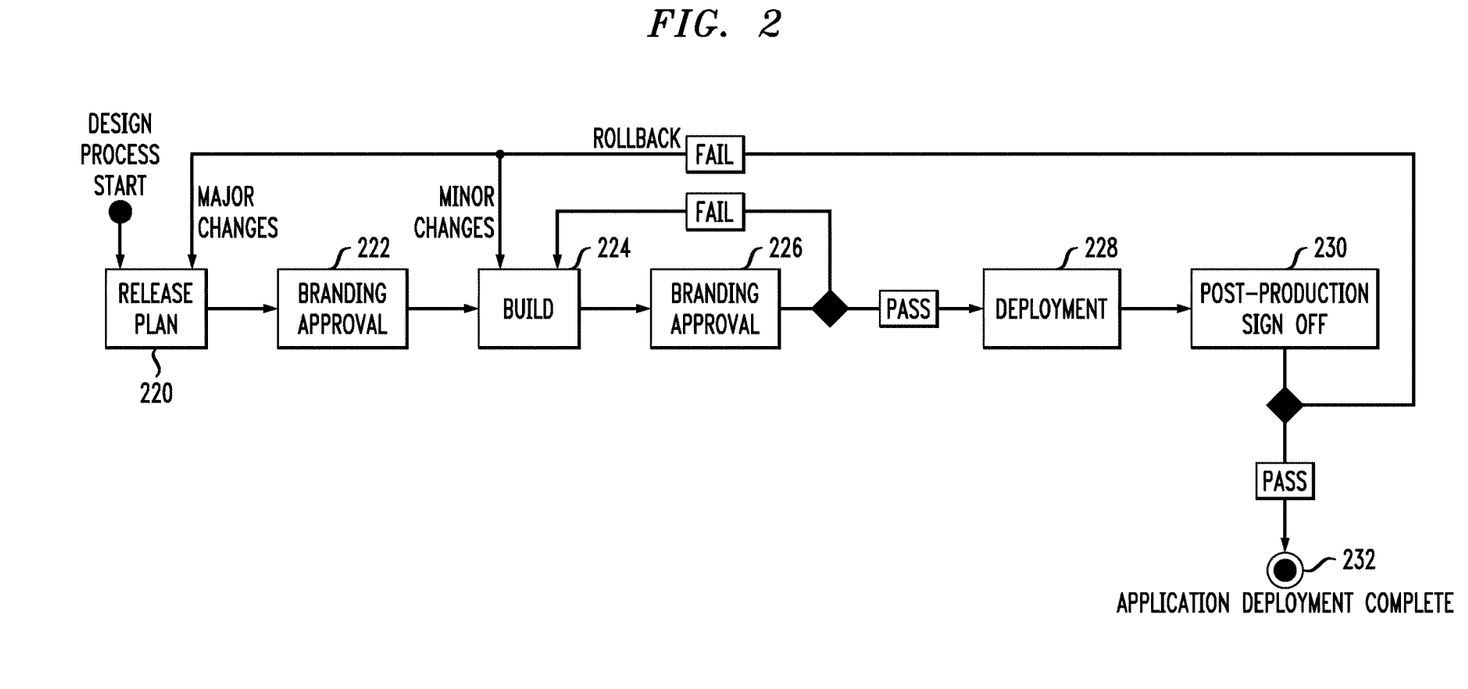
FIG. 2 shows an example design approval workflow in an illustrative embodiment.

FIG. 2 shows an example design approval workflow in an illustrative embodiment. By way of illustration, FIG. 2 depicts starting a design process at step 220 with a plan release. Subsequently, step 222 includes a branding approval process, which can include, for example, a visual design review carried out by an automated application design parameter validation system such as detailed herein (e.g., automated application design parameter validation system 105 as depicted in FIG. 1). While not shown in FIG. 2, it is to be appreciated that a failure event can also occur in connection with the branding approval process in step 222. If such a failure event occurs, the application and/or mock-ups thereof are sent back, for example, to the product design team for one or more enhancements and/or branding compliance.

Also, in an example embodiment, a service level agreement (SLA) related to step 222 might require that this step be completed in a given amount of time (e.g. in one to two hours). Based on a successful outcome of the branding approval process in step 222, step 224 includes building the application. Such a step can include, for example, building and/or generating a version number of the application, a description of the application, and/or an application icon. Such a step can also include, for instance, identifying information pertaining to at least one deployment group related to the application. Additionally, such above-noted details pertaining to the application build can be provided to at least one branding approval team, which carries out an approval process via an automated application design parameter validation system such as detailed herein (e.g., automated application design parameter validation system 105 as depicted in FIG. 1) on such information in step 226. Also, in an example embodiment, an SLA related to step 226 might require that this step also be completed in a given amount of time (e.g. in four to five hours).

If the branding approval process in step 226 results in a failure event (i.e., one or more aspects of the application build do not meet one or more design and/or branding standards of the enterprise), a notification of such failure and information detailing the reasons related thereto are output to the design team and the workflow returns to step 224. If the branding approval process in step 226 results in a lack of any failing event (i.e., the application build passes and/or meets the design and/or branding standards of the enterprise), then the workflow continues to deployment in step 228. In such a step, the application build can be pushed to a production environment. Also, in an example embodiment, an SLA related to step 228 might require that this step also be completed in a given amount of time (e.g. in one week).

Further, as also depicted in FIG. 2, subsequent to deployment in step 228, the workflow continues to step 230, which includes a post-production sign-off process carried out by an automated application design parameter validation system such as detailed herein (e.g., automated application design parameter validation system 105 as depicted in FIG. 1). If the post-production sign-off process in step 230 results in a failure event (i.e., one or more aspects of the application build do not meet one or more design and/or branding standards of the enterprise), a notification of such failure and information detailing the reasons related thereto (e.g., identification of one or more changes necessary) are output to the design team and the workflow returns to step 224 (e.g., if the failure is related to minor changes) and/or to step 220 (e.g., if the failure is related to major changes). If the post-production sign-off process in step 230 results in a lack of any failing event (i.e., the application build passes and/or meets the design and/or branding standards of the enterprise), then the application deployment is deemed complete in step 232.

As noted above, one or more embodiments can be offered and/or implemented as an as-a-service model with one or more varieties of implementations. With respect to the above-noted integration within CI/CD pipelines variety, product teams can map a UI design with the actual implemented visual files (e.g., in a .yaml file) which will be read in runtime by a runner inside the CI/CD pipeline. This information will then be used to run UI scans (e.g., weekly or bi-weekly UI scans) over the mapped pipeline, resulting in regular checks and automated generation of UI validation reports for the product teams. Accordingly, automated application design validation as part of a CI/CD pipeline enables continuous verification. For example, in one or more embodiments, using proper configuration mappings, such an embodiment includes continuously checking design scores of various products and/or applications across one or more enterprise portfolios and/or systems.

With respect to the above-noted platform-as-a-service (PaaS) offering variety, a common platform is created which can be used by designers to perform custom scans on various projects on-demand, which can utilize one or more of the same services as detailed above in connection with the integration within CI/CD pipelines variety to perform required UI validation checks on project files. Such a platform can also be opened for and/or utilized by reviewers from product teams who can access the scan results and process issues (e.g., via collaboration with designers via comments).

In at least one embodiment, such a platform can utilize a custom-built backend service built, for example and as detailed in FIG. 3, using OpenCV, scikit-image, and Python. As detailed herein, such a platform can identify one or more differences between a designer's mockup and a corresponding actual product implementation, and/or between a set of enterprise design guidelines and an actual product implementation.

In such an embodiment, computing differences between two images includes utilizing one or more similarity algorithms and/or measures such as, for example, the Structural Similarity Index (SSIM). Such algorithms and/or measures are used to compare two or more images and determine and/or identify one or more differences between them (e.g., using OpenCV and Python).

Accordingly, at least one embodiment includes utilizing such similarity algorithms and/or measures to create a platform which can be used by various users in an application validation context (e.g., product designers, GTM teams, validation teams, testing teams, product development teams, etc.) to facilitate automated application design validation, incorporating one or more shift-left testing aspects (e.g., the platform and/or techniques related thereto can be utilized at various stages of a product and/or application lifecycle).

FIG. 3 shows an example code snippet for comparing two images and computing at least one similarity value related thereto in an illustrative embodiment. In this embodiment, example code snippet 300 is executed by or under the control of at least one processing system and/or device. For example, the example code snippet 300 may be viewed as comprising a portion of a software implementation of at least part of automated application design parameter validation system 105 of the FIG. 1 embodiment.

The example code snippet 300 illustrates reading two images, the first image being the test subject, and the second image being the standard and/or reference image. Example code snippet 300 also illustrates converting the images into grayscale images (e.g., for performance benefits) and calculating the similarity between the two images. Also, example code snippet 300 shows calculating such a similarity measure using SSIM, which returns how different the two images are from each other with respect to one or more parameters. Example code snippet 300 further illustrates performing image thresholding on the difference(s) of the two images and attempting to determine one or more contours to obtain and/or identify the regions of the two input images that differ. Determining such contours can involve highlighting the corresponding regions (e.g., by drawing a rectangular box around the differentiated area(s)). Further, example code snippet 300 illustrates providing outputs by displaying the original, modified, difference, and thresholded images.

It is to be appreciated that this particular example code snippet shows just one example implementation of a portion of a process for comparing two images and computing at least one similarity values related thereto, and alternative implementations of the process can be used in other embodiments.

As also depicted in the example code snippet of FIG. 3, an SSIM algorithm processes image data from two or more images and identifies and/or highlights one or more structural mismatches. Additionally, one or more embodiments can include fine-tune the SSIM algorithm, for example, to ignore certain aspects such as text differences, color differences, etc.).

Figure 4:
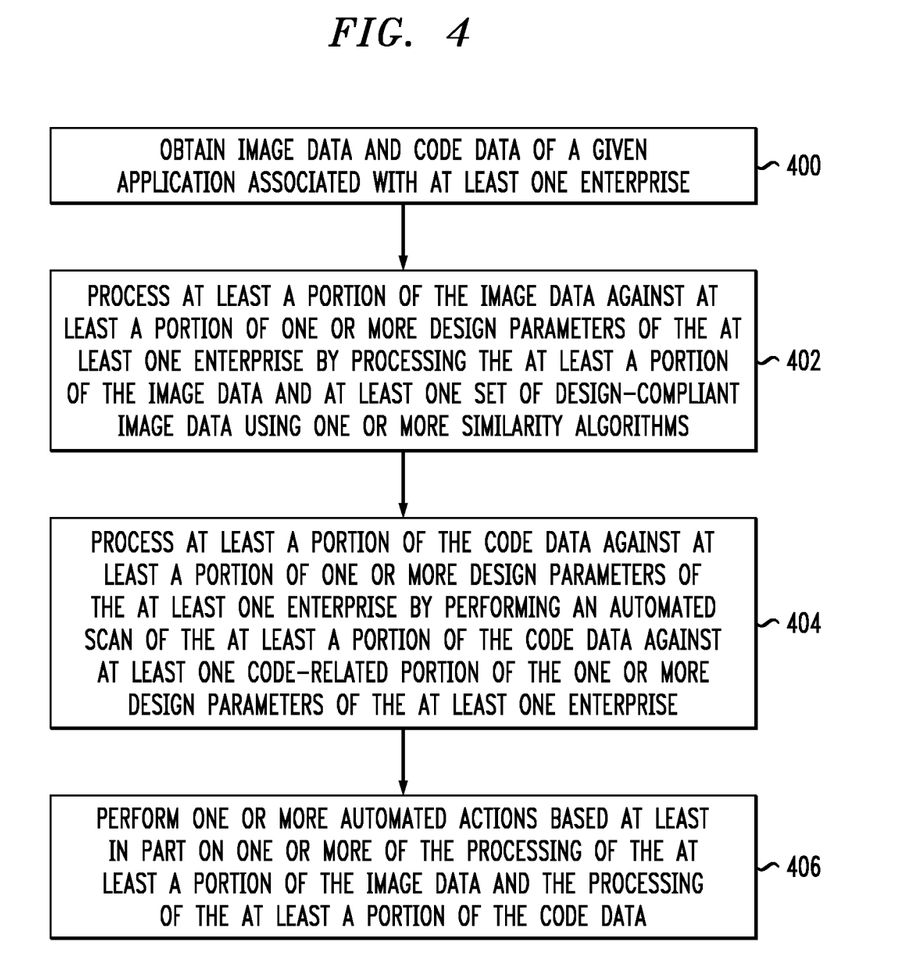
FIG. 4 is a flow diagram of a process for automatically validating design parameters for enterprise applications in an illustrative embodiment.

FIG. 4 is a flow diagram of a process for automatically validating design parameters for enterprise applications in an illustrative embodiment. It is to be understood that this particular process is only an example, and additional or alternative processes can be carried out in other embodiments.

In this embodiment, the process includes steps 400 through 406. These steps are assumed to be performed by the automated application design parameter validation system 105 utilizing its elements 112, 114 and 116.

Step 400 includes obtaining image data and code data of a given application associated with at least one enterprise. Step 402 includes processing at least a portion of the image data against at least a portion of one or more design parameters of the at least one enterprise by processing the at least a portion of the image data and at least one set of design-compliant image data using one or more similarity algorithms. In at least one embodiment, processing at least a portion of the image data includes processing the at least a portion of the image data and at least one set of design-compliant image data using at least one structural similarity index algorithm. Additionally or alternatively, in one or more embodiments, the given application includes a prospective version of the given application, and processing at least a portion of the image data includes processing the at least a portion of the image data of the prospective version of the given application and image data of an implemented product version of the given application using one or more similarity algorithms.

Also, in at least one embodiment, processing the at least a portion of the image data and at least one set of design-compliant image data using one or more similarity algorithms includes identifying one or more differences between the at least a portion of the image data and at least one set of design-compliant image data. In one or more such embodiments, processing at least a portion of the image data can include validating one or more components of the at least a portion of the image data, wherein the one or more components include at least one of iconography, one or more user interface components, user interface layout, one or more required links, and application version information.

Step 404 includes processing at least a portion of the code data against at least a portion of the one or more design parameters of the at least one enterprise by performing an automated scan of the at least a portion of the code data against at least one code-related portion of the one or more design parameters of the at least one enterprise. In at least one embodiment, processing at least a portion of the code data includes validating one or more components of the at least a portion of the code data, wherein the one or more components include at least one of one or more approved color codes, one or more font families, license validation for one or more third party components, one or more modified components selected from a design kit, and one or more icon libraries.

Step 406 includes performing one or more automated actions based at least in part on one or more of the processing of the at least a portion of the image data and the processing of the at least a portion of the code data. In at least one embodiment, performing one or more automated actions includes automatically training the one or more similarity algorithms, based at least in part on the processing of the at least a portion of the image data, to ignore one or more specified aspects of image data. In such an embodiment, automatically training the one or more similarity algorithms includes automatically training the one or more similarity algorithms to ignore at least one of one or more text differences in image data and one or more color differences in image data. Additionally or alternatively, performing one or more automated actions can include automatically carrying out one or more modifications to the given application based at least in part on one or more of the processing of the at least a portion of the image data and the processing of the at least a portion of the code data, and/or automatically outputting, to one or more application developers associated with the given application, one or more suggestions pertaining to one or more modifications to the given application.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically validate an application against enterprise design parameters by processing image data and code data of the application using similarity algorithms and automated code scanning processes. These and other embodiments can effectively overcome problems associated with visual inconsistencies and application release cycle delays caused by error-prone manual validation.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
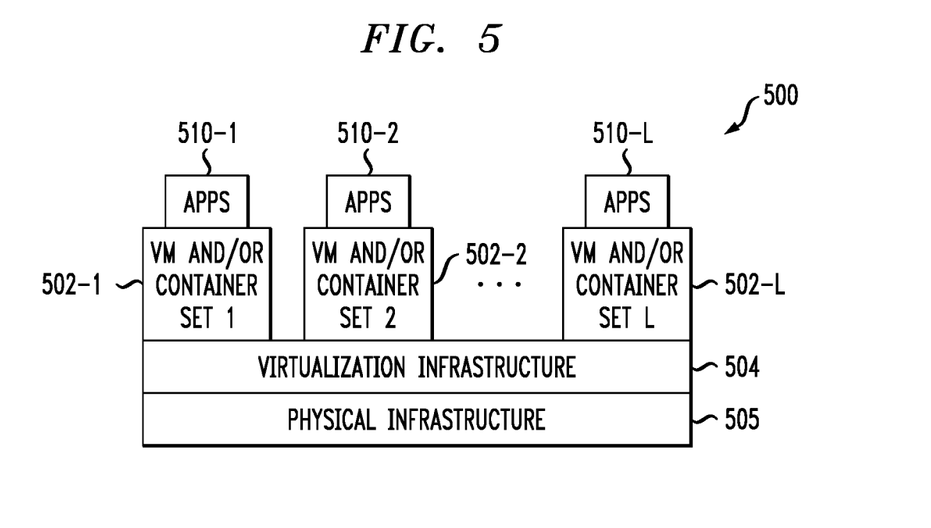
FIGS. 5 and 6 show examples of processing platforms that may be utilized to implement at least a portion of an information processing system in illustrative embodiments.
Figure 6:
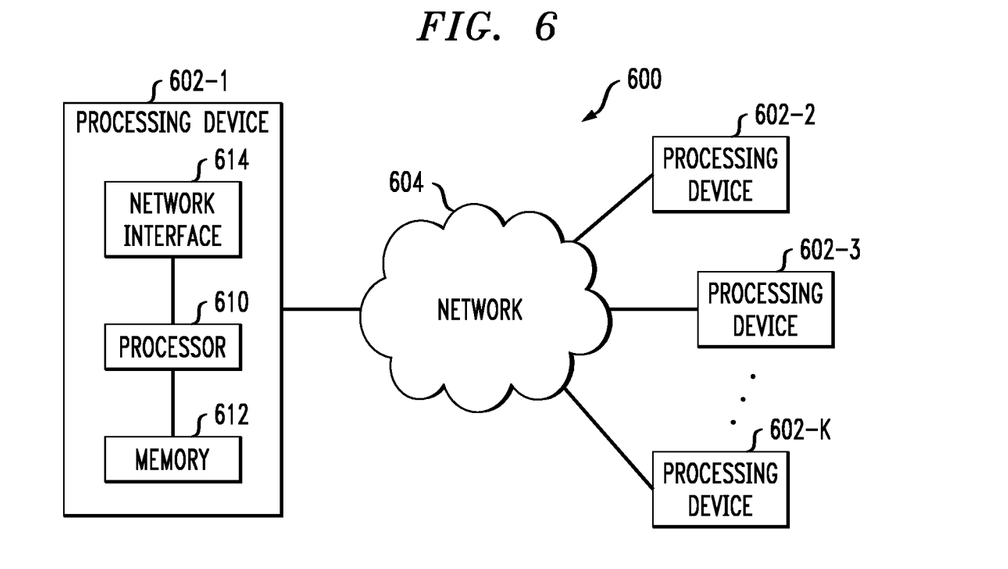

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining image data and code data of a given application associated with at least one enterprise;
processing at least a portion of the image data against at least a portion of one or more design parameters of the at least one enterprise by processing the at least a portion of the image data and at least one set of design-compliant image data using one or more similarity algorithms;
processing at least a portion of the code data against at least a portion of the one or more design parameters of the at least one enterprise by performing an automated scan of the at least a portion of the code data against at least one code-related portion of the one or more design parameters of the at least one enterprise; and
performing one or more automated actions based at least in part on one or more of the processing of the at least a portion of the image data and the processing of the at least a portion of the code data;
wherein the method is performed by at least one processing device comprising a processor coupled to a memory.

2. The computer-implemented method of claim 1, wherein processing at least a portion of the image data comprises processing the at least a portion of the image data and at least one set of design-compliant image data using at least one structural similarity index algorithm.

3. The computer-implemented method of claim 1, wherein the given application comprises a prospective version of the given application, and wherein processing at least a portion of the image data comprises processing the at least a portion of the image data of the prospective version of the given application and image data of an implemented product version of the given application using one or more similarity algorithms.

4. The computer-implemented method of claim 1, wherein performing one or more automated actions comprises automatically training the one or more similarity algorithms, based at least in part on the processing of the at least a portion of the image data, to ignore one or more specified aspects of image data.

5. The computer-implemented method of claim 4, wherein automatically training the one or more similarity algorithms comprises automatically training the one or more similarity algorithms to ignore at least one of one or more text differences in image data and one or more color differences in image data.

6. The computer-implemented method of claim 1, wherein performing one or more automated actions comprises automatically carrying out one or more modifications to the given application based at least in part on one or more of the processing of the at least a portion of the image data and the processing of the at least a portion of the code data.

7. The computer-implemented method of claim 1, wherein performing one or more automated actions comprises automatically outputting, to one or more application developers associated with the given application, one or more suggestions pertaining to one or more modifications to the given application.

8. The computer-implemented method of claim 1, wherein processing the at least a portion of the image data and at least one set of design-compliant image data using one or more similarity algorithms comprises identifying one or more differences between the at least a portion of the image data and at least one set of design-compliant image data.

9. The computer-implemented method of claim 1, wherein processing at least a portion of the image data comprises validating one or more components of the at least a portion of the image data, wherein the one or more components comprise at least one of iconography, one or more user interface components, user interface layout, one or more required links, and application version information.

10. The computer-implemented method of claim 1, wherein processing at least a portion of the code data comprises validating one or more components of the at least a portion of the code data, wherein the one or more components comprise at least one of one or more approved color codes, one or more font families, license validation for one or more third party components, one or more modified components selected from a design kit, and one or more icon libraries.

11. A non-transitory processor-readable storage medium having stored therein program code of one or more software programs, wherein the program code when executed by at least one processing device causes the at least one processing device:
to obtain image data and code data of a given application associated with at least one enterprise;
to process at least a portion of the image data against at least a portion of one or more design parameters of the at least one enterprise by processing the at least a portion of the image data and at least one set of design-compliant image data using one or more similarity algorithms;
to process at least a portion of the code data against at least a portion of the one or more design parameters of the at least one enterprise by performing an automated scan of the at least a portion of the code data against at least one code-related portion of the one or more design parameters of the at least one enterprise; and
to perform one or more automated actions based at least in part on one or more of the processing of the at least a portion of the image data and the processing of the at least a portion of the code data.

12. The non-transitory processor-readable storage medium of claim 11, wherein processing at least a portion of the image data comprises processing the at least a portion of the image data and at least one set of design-compliant image data using at least one structural similarity index algorithm.

13. The non-transitory processor-readable storage medium of claim 11, wherein the given application comprises a prospective version of the given application, and wherein processing at least a portion of the image data comprises processing the at least a portion of the image data of the prospective version of the given application and image data of an implemented product version of the given application using one or more similarity algorithms.

14. The non-transitory processor-readable storage medium of claim 11, wherein performing one or more automated actions comprises automatically training the one or more similarity algorithms, based at least in part on the processing of the at least a portion of the image data, to ignore one or more specified aspects of image data.

15. The non-transitory processor-readable storage medium of claim 11, wherein performing one or more automated actions comprises automatically carrying out one or more modifications to the given application based at least in part on one or more of the processing of the at least a portion of the image data and the processing of the at least a portion of the code data.

16. An apparatus comprising:
at least one processing device comprising a processor coupled to a memory;
the at least one processing device being configured:
to obtain image data and code data of a given application associated with at least one enterprise;
to process at least a portion of the image data against at least a portion of one or more design parameters of the at least one enterprise by processing the at least a portion of the image data and at least one set of design-compliant image data using one or more similarity algorithms;

to process at least a portion of the code data against at least a portion of the one or more design parameters of the at least one enterprise by performing an automated scan of the at least a portion of the code data against at least one code-related portion of the one or more design parameters of the at least one enterprise; and to perform one or more automated actions based at least in part on one or more of the processing of the at least a portion of the image data and the processing of the at least a portion of the code data.

17. The apparatus of claim 16, wherein processing at least a portion of the image data comprises processing the at least a portion of the image data and at least one set of design-compliant image data using at least one structural similarity index algorithm.

18. The apparatus of claim 16, wherein the given application comprises a prospective version of the given application, and wherein processing at least a portion of the image data comprises processing the at least a portion of the image data of the prospective version of the given application and image data of an implemented product version of the given application using one or more similarity algorithms.

19. The apparatus of claim 16, wherein performing one or more automated actions comprises automatically training the one or more similarity algorithms, based at least in part on the processing of the at least a portion of the image data, to ignore one or more specified aspects of image data.

20. The apparatus of claim 16, wherein performing one or more automated actions comprises automatically carrying out one or more modifications to the given application based at least in part on one or more of the processing of the at least a portion of the image data and the processing of the at least a portion of the code data.

* * * * *